July 30, 1963 R. N. WENDRICKS ET AL 3,099,442
METHOD AND APPARATUS FOR FEEDING SHEET MATERIAL
Filed April 11, 1961 4 Sheets-Sheet 1

INVENTOR.
ROLAND NORBERT WENDRICKS
ROBERT MILLER WEYGANT
BY John H. Midney
George W. Reiber
ATTORNEYS July 30, 1963  R. N. WENDRICKS ET AL  3,099,442
METHOD AND APPARATUS FOR FEEDING SHEET MATERIAL
Filed April 11, 1961  4 Sheets-Sheet 2
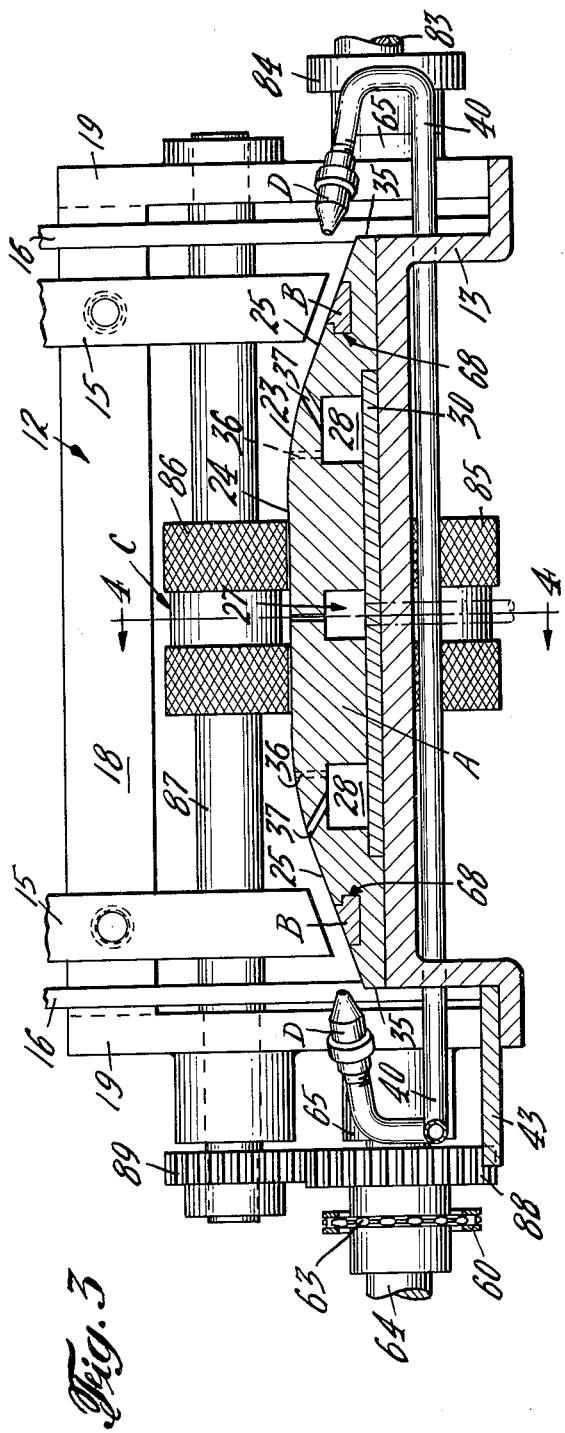
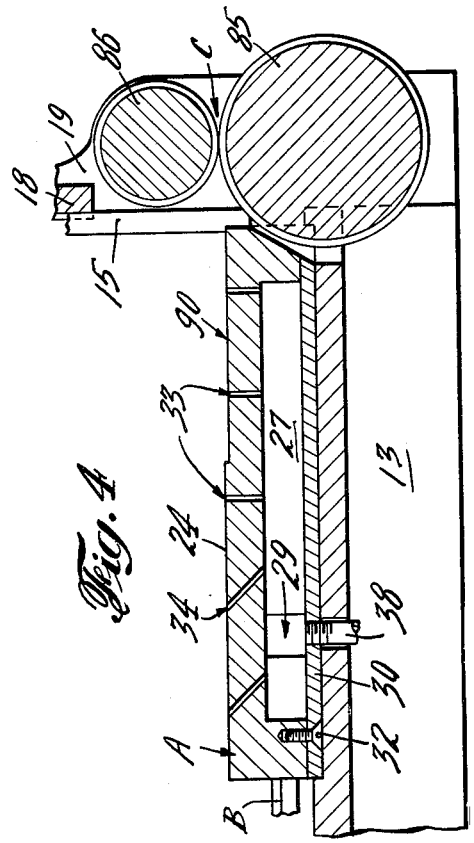
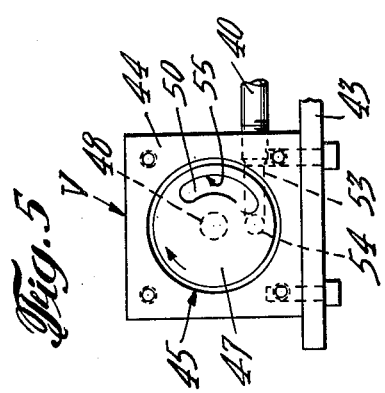
INVENTOR.
ROLAND NORBERT WENDRICKS
ROBERT MILLER WEYGANT
BY
John H. Midney
George W. Reiber
ATTORNEYS

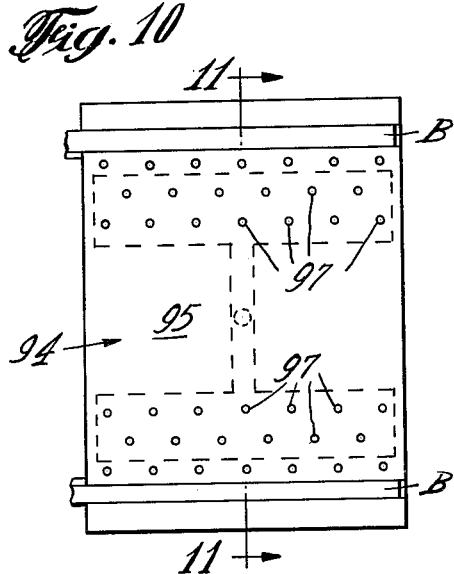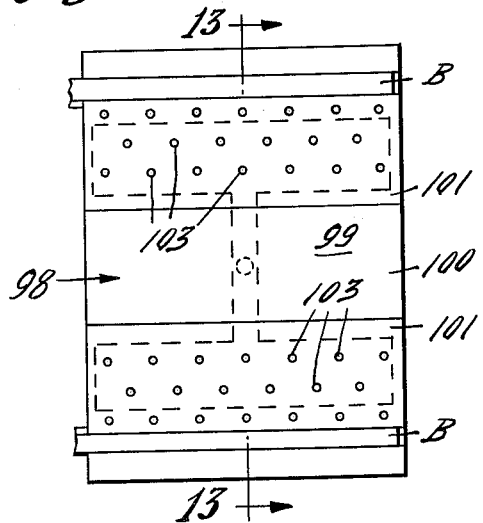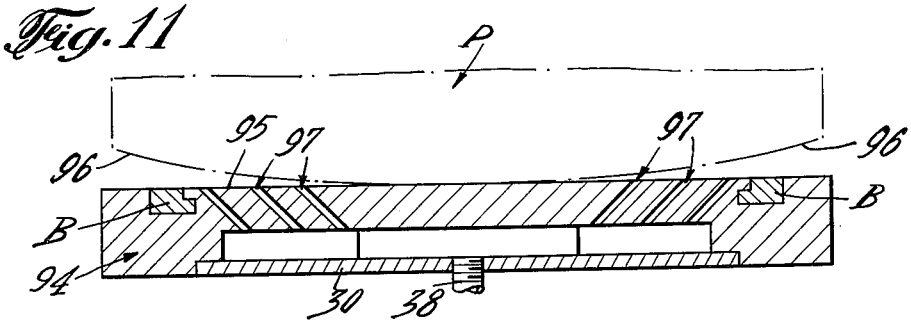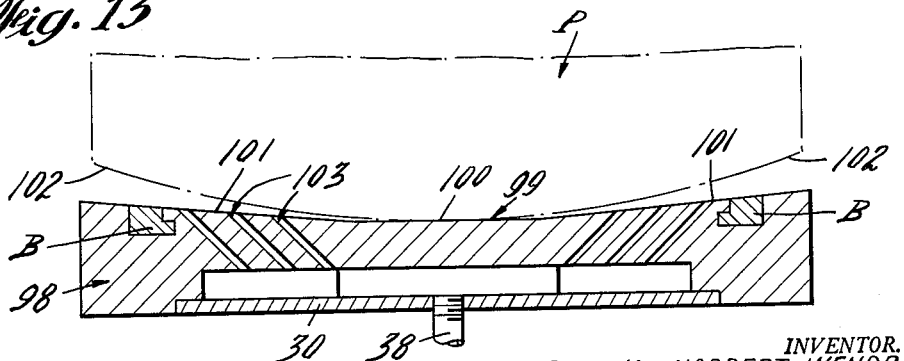

United States Patent Office

3,099,442
Patented July 30, 1963

3,099,442
METHOD AND APPARATUS FOR FEEDING SHEET MATERIAL
Roland Norbert Wendricks, Barrington, and Robert Miller Weygant, Waukegan, Ill., assignors to American Can Company, New York, N.Y., a corporation of New Jersey
Filed Apr. 11, 1961, Ser. No. 102,155
17 Claims. (Cl. 271—32)

The present invention relates to the separation and feeding of single sheets of a flexible material from a stacked supply of such sheets and has particular reference to a method of and apparatus for separating and advancing such sheets in succession at high speed from the bottom of a pile or stack of the sheets.

The feeding of the lowermost sheet or blank from a stack or pile as is employed with many different kinds of machines possesses considerable advantages over the feeding of the topmost sheet. The most important advantages are that the supply stack can be replenished without any interruption in the operating process and that the withdrawal of the sheets always proceeds in the same plane. However, when the lowermost sheet is being fed from a stack, the weight of the entire stack which bears on this sheet acts in a disadvantageous manner owing to the frictional forces created during the withdrawal of the sheet from between the stack and the supporting plate carrying the stack. These frictional forces tend to hinder the separation and feeding of the individual sheets and often result in the feeding of two or more sheets simultaneously. When this occurs, the feeding mechanism may become jammed and the sheets damaged or, e.g., when the sheets are fed to a station in which they are subjected to a processing operation, the sheets are improperly processed and must be discarded.

The feeding of sheets from the bottom of a supply stack is particularly difficult where the sheets have a coating thereon which has a high friction coefficient, e.g., fibre blanks having polyethylene coated surfaces. Conventional coin feed type mechanisms have not been successful for feeding such polyethylene coated sheets due to the high frictional forces between the polyethylene coated surfaces and between the polyethylene surface and the metal supporting plate on which the supply stack rests. These frictional forces hinder the separation of the individual sheets from the stack and often result in buckling of the edge of the sheet to which pressure is applied in pushing the sheet from beneath the stack. Attempts to reduce the friction by dusting the polyethylene coated sheets with a powdered material such as finely divided starch have been unsatisfactory since the large quantity of powdered material required to achieve even partial success tends to accumulate on the working parts of the feed mechanism and render the mechanism inoperative.

Accordingly, an object of the present invention is to provide a method of feeding individual sheets successively from the bottom of a supply stack which will overcome the problems hereinbefore pointed out.

Another object is to provide such a method wherein the lowermost sheet positively separated from the supply stack without scratching or otherwise marring the edges of the sheets.

Another object is to provide such a method wherein the friction between the lowermost sheet and the stack lying above it and between this sheet and the stack supporting plate is considerably reduced so that the withdrawal of the sheet can be easily accomplished.

Another object is to provide an apparatus for feeding thin flexible sheets successively from the bottom of the stack wherein the flow of a gaseous fluid such as air effects the separation of the lowermost sheet from the overlying stack.

Another object is to provide such an apparatus in which a gas such as air is used to reduce the frictional forces on the sheet being withdrawn from the stacked supply.

A further object is to provide such an apparatus for feeding sheets having surfaces with high coefficients of friction wherein a gas such as air is used to reduced the friction on both sides of the lowermost sheet as it is being fed.

Still a further object is to provide such an apparatus which can be used for feeding either flat or bowed sheets.

Numerous other objects and advantages of the invention will be apparent as it is better understood from the following description, which, taken in connection with the accompanying drawings, discloses a preferred embodiment thereof.

Referring to the drawings:

FIG. 3 is an enlarged partial sectional view taken substantially along line 3—3 of FIG. 1;

FIG. 4 is a sectional view taken substantially along line 4—4 of FIG. 3;

FIG. 5 is an enlarged partial sectional view taken substantially along line 5—5 of FIG. 1;

FIGURES 6 thru 9 are schematic views illustrating the sequence of steps in which the apparatus separates the most lowermost sheet from the stack and supports this sheet between layers of air.

FIGURES 10 and 12 are plan views of support plates which are used for feeding sheets which are curved or bowed rather than flat.

FIGURE 11 is a sectional view taken substantially along line 11—11 of FIGURE 10.

FIG. 13 is a sectional view taken substantially along line 13—13 of FIG. 12.

Figure 6:
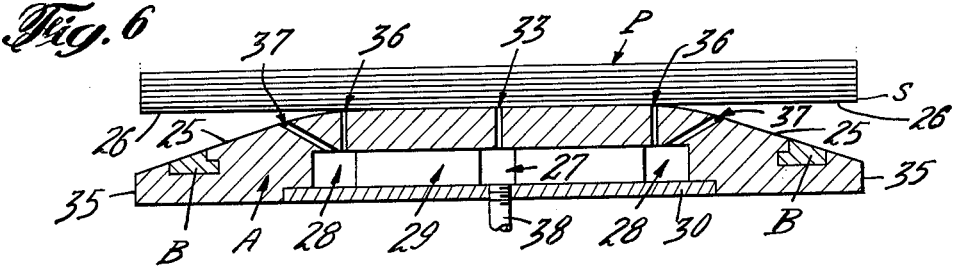
Figure 7:
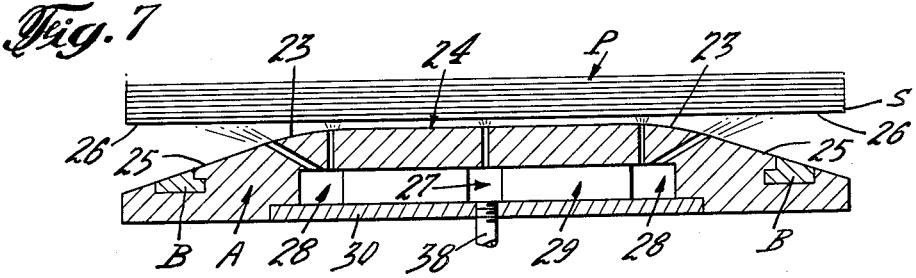
Figure 8:
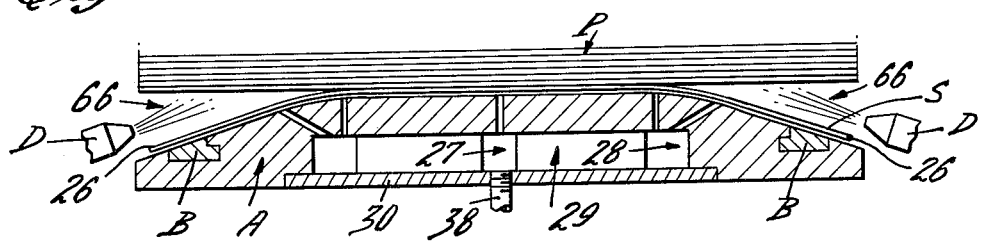

The aforementioned objects are accomplished in the present invention by positioning a stacked supply P of sheets on a support plate A having longitudinal edge portions which are contoured away from the lowermost sheet S to form spaces therebetween (FIG. 6). A pressurized gas such as air is introduced between the lowermost sheet S and the support plate through a plurality of holes provided in the support plate (FIG. 7). This air flowing at a rapid rate towards the longitudinal edges of the stacked sheets P produces a static pressure below the lowermost sheet S which is less than the ambient atmospheric pressure present on the upper surfaces of the sheet. This differential pressure on the upper and lower surfaces of the lowermost sheet S causes the longitudinal edge portions of the sheet to be separated from the stack P and to be depressed towards the support plate A, the aforementioned spaces permitting this separation to take place (FIG. 8). The depressed portions of the lowermost sheet S are then engaged by feed bars B reciprocably mounted in the support plate A which advance the sheet into the grip of a pair of feed rolls C, the feed rolls completing the withdrawal of the sheet S from beneath the stack.

Figure 9:
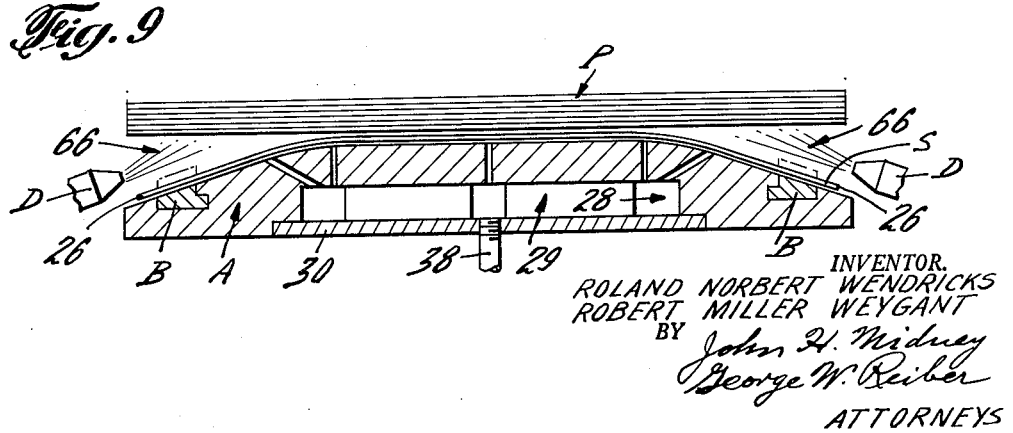

The air flowing between the support plate A and the lowermost sheet S forms a layer therebetween which air layer, by providing holes in the central portion of the support plate, can be made to extend completely across the bottom area of the sheet (FIG. 8). The lowermost sheet S is thus supported on a thin layer of air out of contact with the support plate. This intervening air layer acts as a lubricant and reduces the frictional force between the lowermost sheet and the support plate thereby facilitating the withdrawal of the sheet.

Where the withdrawal of the lowermost sheet S is difficult to accomplish due to a high frictional force between the sheet S and the overlying stack P resting thereon, the stack is lifted from the lowermost sheet by forming an air layer therebetween. This is accomplished by positioning air nozzles D on either side of the stacked supply P and blowing a gas such as air between the lowermost sheet S and the next adjacent sheet (FIG. 9). The stack lifting air is supplied intermittently during a predetermined period of each sheet feeding cycle and is controlled by a valve V operating in a timed relationship with the actuation of the feed bars B. The lowermost sheet S is thus supported between two layers of air during the feeding operation thereby providing complete air lubrication and enabling the sheet to be readily withdrawn from beneath the stack P with a minimal frictional force.

Figure 1:
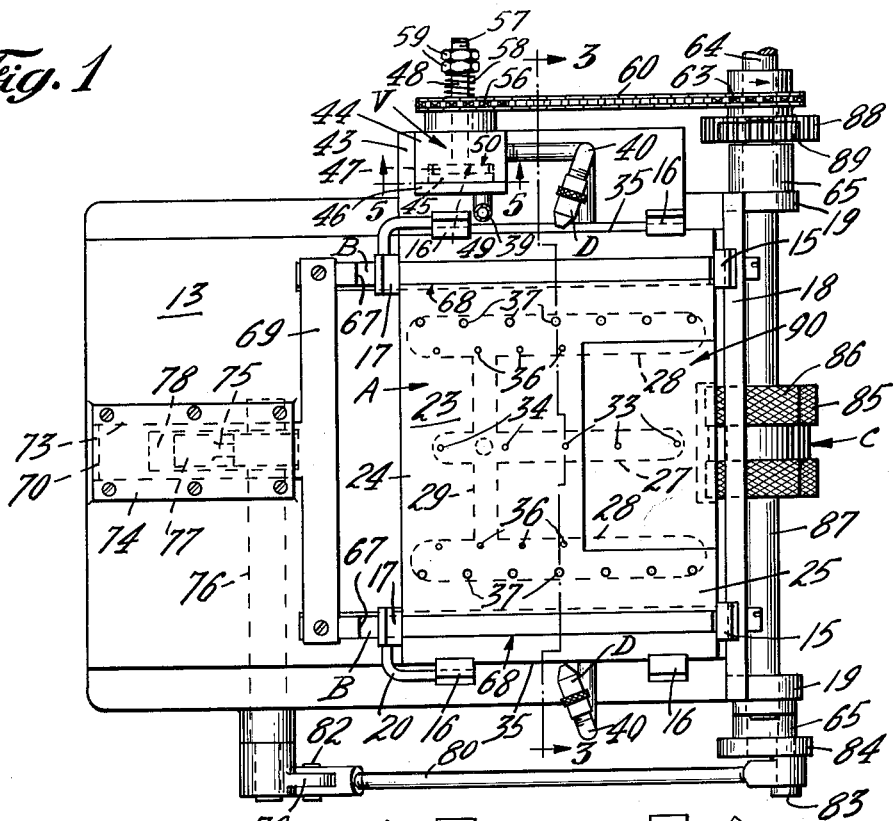
FIGURES 1 and 2 are plan and side views respectively of an apparatus embodying the features of the present invention.
Figure 2:
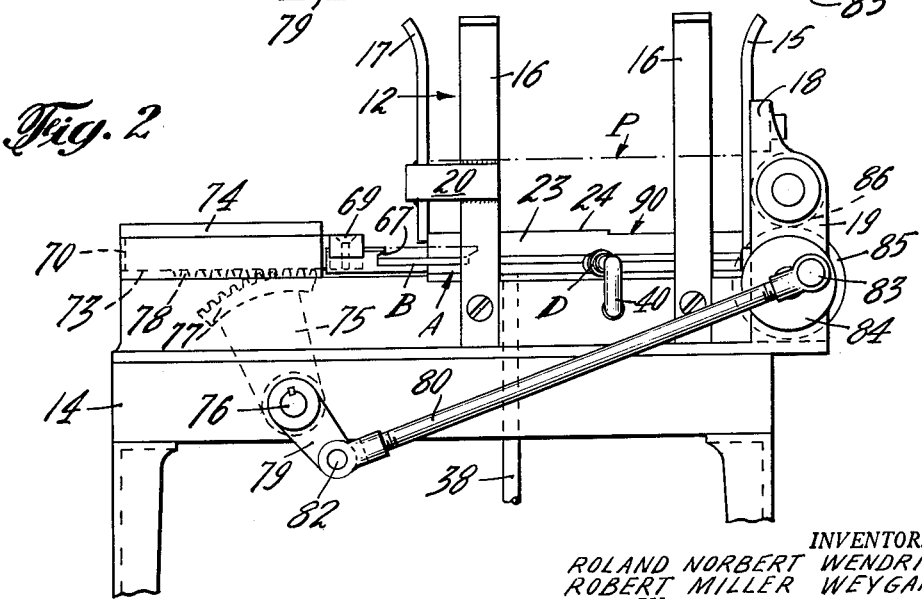

As a preferred or exemplary embodiment of the instant invention FIGURES 1 and 2 show a sheet feeding device for feeding thin rectangular substantially flat flexible sheets individually from the bottom of a stack of such sheets retained in a supply magazine 12. The supply magazine 12 is disposed above a support plate A which is secured to a horizontal table 13 mounted on a machine frame 14. The machine frame 14 may be a part of the machine to which the sheets are being fed for further processing. The supply magazine 12 comprises vertically disposed front, side and rear guide members 15, 16 and 17 respectively which align the stacked sheets with the support plate A while permitting the stack to move freely in the vertical direction. The front guide members 15 are secured to a horizontal cross bar 18 which is integrally connected at its ends to a pair of upright brackets 19 extending upwardly from the horizontal table 13. The side guide members 16 are secured to the sides of the horizontal table 13 adjacent the longitudinal edges of the support plate A. The rear guide members 17 are fastened to angle brackets 20, which brackets are secured to the rearwardly disposed side members 16.

The support plate A has an upper surface 23 comprising a horizontal central portion 24 and downwardly and outwardly inclined longitudinal edge portions 25 (FIG. 3). The shape of the support plate surface 23 is determined by the type of sheets to be fed. As indicated in FIG. 6 a stacked supply of flat sheet P placed in the magazine 12 rests on and is supported by the horizontal central portion 24 of the support plate surface 23. The lowermost sheet S has longitudinal edge portions 26 which are unsupported being disposed above the downwardly inclined edge portions 25 of the support plate. The width of the horizontal central portion 24 is determined by the stiffness of the sheet material and is sufficient to prevent the longitudinal edge portions 26 of the lowermost sheet S from draping downwardly because of their unsupported weight.

Disposed within the support plate 12 are longitudinally extending ducts 27, 28, interconnected by a cross duct 29. The bottom surfaces of the ducts 27, 28, 29, are formed by a bottom cover 30 secured to the underside of the support plate A by screw 32. The duct 27 is disposed approximately on the longitudinal center line of the support plate A and has a series of vertically disposed holes 33 and rearwardly inclined holes 34 extending to the support plate surface 23 substantially along the longitudinal center line of the support plate (FIG. 4). The inclination of the holes 34 serves a purpose which will hereinafter be made clear.

The ducts 28 are positioned intermediate the center line and the longitudinal edges 35 of the support plate A and have a series of vertically disposed holes 36 extending to the support plate surface 23 approximately at the outer extremities of the horizontal central portion 24 and also a series of outwardly inclined holes 37 extending to the inclined portions 25 of the support plate surface 23. A pressurized gas such as air flows continuously into the ducts 27, 28 and 29 through a supply pipe 38 connected to the bottom cover 20 adjacent the cross duct 29.

The pressurized air flowing from the ducts 28 and 29 thru the holes 33, 34, 36 and 37 impinges against the bottom surface of the lowermost sheet S and forces the stacked sheets P upwardly a slight amount above the support plate surface 23 to form an escape path therebetween (FIG. 7). Due to the weight of the stacked sheets P the thickness of the escaping air layer formed between the lowermost sheet S and the support plate surface 23 is very small and as a result the velocity of the air flowing towards the edges of the sheet becomes quite high. Consequently, and in accordance with the Law of Conservation of Energy, a large proportion of the total pressure of the air emerging from the holes 33, 34, 36, and 37 is converted into dynamic pressure and the static pressure of the air flowing below the lowermost sheet S is correspondingly decreased to a value less than the ambient atmospheric pressure present on the upper surfaces of the unsupported longitudinal edge portions 26 of the lowermost sheet. The resulting pressure differential causes the longitudinal edge portions 26 of the lowermost sheet S to be bent towards the support plate A while simultaneously being supported a spaced distance from the plate by the air layer flowing therebetween (FIG. 8).

The number and location of the holes 36 and 37 are determined by the pressure differential required to bend the longitudinal edge portions 26 of the lowermost sheet S which in turn is largely a function of the stiffness of the sheet material. A greater pressure differential and therefore a greater bending force on the longitudinal edge portions 26 may be produced in various ways, e.g., by positioning the holes in closer proximity to the lower surface of the sheet; by inclining the holes so that the air flow impinges against the bottom surface of the lowermost sheet in a direction more closely approaching the direction parallel to the sheet surface; by increasing the air velocity by using more highly pressurized air; or by increasing the air velocity by providing more holes and thereby a greater flow of air.

Subsequent to the depression of the longitudinal edge portions 26 of the lowermost sheet S toward the support plate A, a rotary valve V allows pressurized air from a supply pipe 39 to flow thru a branched tube 40 to the two nozzles D disposed adjacent the sides of the stacked sheets. The valve V is mounted on a frame member 43 extending from the horizontal table 13 and has a housing 44 with a cylindrical cavity 45 therein. The cavity 45 is closed by a cover plate 46 to which the air supply pipe 39 is threadably attached. A valve disc 47 having a shaft 48 integral therewith is rotatably mounted in the housing 44 and has a surface 49 in rotating and sliding engagement with a surface 50 of the cavity 45. A passage 53 extending thru the housing 44 is connected at one end to the branched tube 40 and has a circular opening 54 disposed on the cavity surface 50. A curved slot 55 in the valve disc 47 exposes the opening 54 to the pressurized air in the cavity 45 for a predetermined portion of the rotary movement of the valve disc 47 (FIG. 5). Hence, the pressurized air is allowed to flow intermittently thru the passage 53 and branched tube 40 to the nozzles D as the valve disc 47 is rotated.

A portion of the valve shaft 48 extending outwardly from the housing 44 has a sprocket 56 suitably keyed thereto. The shaft 48 has a threaded outer end 57 with a spring 58 disposed on the shaft between the sprocket 56 and retaining nuts 59 threadably engaged to the end 57. The spring 58 urges the valve disc surface 49 into close engagement with the cavity surface 50 to maintain an air seal therebetween. The sprocket 56 is driven by an endless link chain 60 which also operates over a sprocket 63 carried on a rotating drive shaft 64. The drive shaft 64 is journaled in suitable bearings 65 formed in the brackets 19 and is the source of power for operating the feeding device.

The nozzles D direct the pressurized air at high velocity into openings 66 formed between the depressed longitudinal edge portions 26 of the lowermost sheet S and the bottom of the next adjacent sheet. Preferably the nozzles D are positioned so that the air is directed slightly rearwardly and against both the lowermost sheet and the next adjacent sheet as well as at the point where they meet (FIG. 9). The high velocity air entering the spaces 66 causes the stack P to be slightly elevated from the lowermost sheet S and forms a thin air layer therebetween. The height of the opening 66 which is determined by the shape of the longitudinal edge portions 25 of the support plate A must be large enough to permit the air to enter the opening without pulling the upper sheets into the air stream.

While the lowermost sheet S is thus supported between two layers of air, the sheet is engaged along the depressed portions of the rearwardly disposed transverse edge by upwardly extending feed shoulders 67 formed on two feed bars B. During this interval the air emerging at a high velocity from the rearwardly inclined holes 34 in the support plate A impinges against the bottom surface of the lowermost sheet S in a rearwardly direction thereby exerting a slight rearward force on the sheet. This force tends to push the air supported lowermost sheet S towards the feed shoulder 67 and prevents the sheet from prematurely floating out from beneath the stack P.

The feed bars B are slidably mounted in longitudinally extending slots 68 formed in the support plate A adjacent the longitudinal edges 35 thereof. Rearwardly of the shoulder 67 the feed bars B are connected to a cross member 69 which is integral with a longitudinally extending slide 70. The slide 70 is reciprocably mounted in a horizontally disposed slideway 73 formed in the table 13 and is retained therein by a cover plate 74.

Reciprocation of the slide 70 and thereby the feed bars B is accomplished by means of a lever 75 having one end mounted on a rock shaft 76 journaled in the frame 14. The lever 75 extends upwardly from the rock shaft thru openings in the frame 14 and table 13 and has a segment gear 77 formed on the upper end meshing with a gear rack 78 formed on the bottom of the slide 70. A portion of the rock shaft 76 extends outwardly from the frame 14 and has mounted thereon a lever 79. A connecting rod 80 is pivotally connected at one end to the lever 79 by a pin 82. The other end of the connecting rod 80 is pivotally connected to a pin 83 eccentrically positioned on a flange 84 mounted on the rotating drive shaft 64. As the drive shaft 64 rotates, the lever 79 and thereby the rock shaft 76 and segment gear 77 are oscillated by the connecting rod 80. The segment gear 77 meshing with the gear rack 78 causes the slide 70 and feed bars B to be reciprocated forward and back during each revolution of the drive shaft 64. Each revolution of the drive shaft 64 also causes the rotary valve V to be opened and closed, the opening and closing of the valve having a predetermined time relationship to the forward and backward movement of the feed bars B.

If desired the sheet S may be entirely removed from the supply magazine 12 by providing the feed bars B with a sufficiently long stroke. However, for high speed feeding of the sheets it is preferable to provide the feed bars B with a short stroke so that the sheet S is merely started along its path of travel by the feed bars, being advanced thereby into the nip of a pair of rapidly rotating pinch rolls C which complete the withdrawal of the sheet. The pinch rolls C include a lower feed roll 85 mounted on the drive shaft 64 and an upper pressure roll 86 with the nip of the rolls being disposed adjacent the forward end of the support plate surface 23. The pressure roll 86 is mounted on a cross shaft 87 journaled in suitable bearings formed in the bracket 19. A gear 88 mounted on the drive shaft 64 meshes with a gear 89 on the cross shaft 87 to drive the pressure roll 86 at the same peripheral speed as the feed roll 85.

As the sheet S is being advanced from the supply magazine 12 by the feed bars B and pinch rolls C, the valve V may maintain the flow of pressurized air to the nozzles D so that the stack P is elevated from the lowermost sheet S until the sheet is fully advanced from beneath the stack. However, in the preferred embodiment shown in the drawings the horizontal central portion 24 of the support plate surface 23 has a depressed section 90 adjacent the pinch rolls C which is lower than the remaining section by approximately the thickness of the sheets being fed (FIG. 4). As the lowermost sheet S is being withdrawn by the pinch rolls C, the valve V cuts off the flow of stack supporting air to the nozzles D as soon as the rear edge of the sheet has reached the depressed section 90. The stack P is prevented from exerting its full weight on the partially advanced sheet S because the stack is largely supported by the rear elevated section of the central portion 24 of the support plate surface 23. Hence the withdrawal of the lowermost sheet by the pinch rolls C proceeds readily even though the stack is no longer elevated therefrom.

It is to be understood that while the preferred embodiment of the invention described can be used for feeding sheets having both high and low surface friction coefficients the subject invention can be used in a more simplified form where only the separation and feeding of sheets having low surface friction coefficients is contemplated. Under such circumstances, the frictional force between the lowermost sheet S and the overlying stack P may not be unduly great, obviating the necessity for supporting the stack while the lowermost sheet is being withdrawn. Consequently, the air valve V and nozzles D which accomplish this result may be dispensed with. For the same reasons there may be no necessity for forming a complete air layer between the lowermost sheet S and the support plate A and therefore the air holes provided along the center line of the support plate for this purpose are not required.

Moreover, the subject invention is equally suited for feeding curved or bowed sheets, as for example sheets which are curved by virtue of their being cut from a continuous tightly rolled supply of material. With curved sheets, the modified support plates shown in FIGURES 10 thru 13 are employed. For sheets having a slight curvature, a modified support plate 94 having a substantially flat horizontal upper surface 95 is used (FIGURES 10 and 11). The longitudinal edge portions 96 of the stacked sheets positioned on the support plate 95 are elevated from the flat surface 95 due to the curvature of the sheets. The pressurized air is introduced between the lowermost sheet and the support plate surface 95 through a series of outwardly inclined holes 97. The air flows at a high velocity towards the longitudinal edges of the sheets in the same manner as heretofore described and creates a pressure differential which causes the longitudinal edge portions 96 of the lowermost sheet to be depressed towards the support plate surface 95. The depressed portions of the lowermost sheet are then engaged by the feed bars B reciprocably mounted in the support plate 94 and fed from beneath the stack.

For sheets having a substantial curvature a modified support plate 98 as shown in FIGURES 12 and 13 is used. The support plate 98 has an upper surface 99 comprising a horizontal central portion 100 and upwardly and outwardly inclined longitudinal edge portions 101. The longitudinal edge portions 102 of the lowermost sheet are elevated from the longitudinal edge portions 101 of the support plate 98 due to the curvature of the sheets. The pressurized air flowing from a series of outwardly inclined holes 103 causes the longitudinal edge portions 102 of the lowermost sheet to be depressed towards the support plate surface 99 and the separated sheet is then fed from the stack in the manner heretofore described.

It is readily apparent that the apparatus described, which exemplifies the method steps of the invention, provides an efficient feeding device for positively feeding individual sheets at high speed from the bottom of a stack of such sheets. The subject invention can be used for feeding either fiber or metallic sheets so long as they possess sufficient flexibility to permit the differential air pressures obtainable by the subject method to depress a portion of the sheet from its natural free position. By means of the subject invention, high speed feeding of sheets having a high surface friction coefficient, which cannot easily be separated and fed from the bottom of a stack by conventional coin type feed devices, can be readily accomplished. For example, using the preferred embodiment described and an air supply pressure of approximately 50 p.s.i., 8" x 11" fiber sheets having a thickness of 0.17" and coated with polyethylene on both surfaces can be reliably fed at a rate of 300 to 400 sheets per minute.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. A method of singly feeding the lowermost sheet from a stacked quantity of thin flexible sheets comprising the steps of, placing said stacked sheets on a support surface, said support surface forming transversely divergent passages with the longitudinal edge portions of said lowermost sheet, introducing pressurized air between said support surface and said lowermost sheet, said air flowing at a high velocity towards the longitudinal edges of said sheet thereby creating a pressure differential on the longitudinal edge portions of the lowermost sheet and causing said edge portions to be bent and depressed towards said support surface while simultaneously being spaced therefrom due to the air flowing therebetween, engaging said lowermost sheet at the depressed portions thereof, and advancing said lowermost sheet from beneath said stacked quantity of sheets.

2. The method set forth in claim 1 wherein said air flowing between said lowermost sheet and said supporting surface forms essentially a continuous layer of air therebetween.

3. The method set forth in claim 2 wherein subsequent to the depression of the longitudinal edge portions of said lowermost sheet towards said support member, and prior to and during the advancing of said sheet from beneath said stacked sheets, air at a high velocity is directed into the spaces formed between the depressed edge portions of said lowermost sheet and the remainder of said stacked sheets, said air causing said remainder of said stacked sheets to be slightly elevated above said lowermost sheet and forming a thin air layer therebetween whereby the frictional force on said lowermost sheet during the advancing thereof is substantially reduced and the individual feeding of said sheets is thereby facilitated.

4. The method set forth in claim 1 wherein said sheets are substantially flat.

5. The method set forth in claim 1 wherein said sheets have a transverse curvature.

6. An apparatus for singly feeding the lowermost sheet from a stacked quantity of thin flexible sheets comprising, a support member having a support surface, a magazine mounted above said support member for positioning a supply of sheets in stacked formation on said support surface, said support surface forming transversely divergent passages with the longitudinal edge portions of the lowermost sheet positioned thereon, means in said support member for introducing pressurized air between said support surface and said lowermost sheet, said air flowing at a high velocity towards the longitudinal edges of said lowermost sheet and creating thereby a pressure differential on the longitudinal edge portions of said sheet, said pressure differential causing said longitudinal edge portions to be depressed towards said support surface while simultaneously being maintained at a spaced distance from said support surface due to the air flowing therebetween, and feed means including means for engaging said depressed portions of said lowermost sheet for longitudinally advancing said sheet from beneath said stacked sheets whereby said sheets are individually fed from said stacked supply of sheets.

7. The apparatus set forth in claim 6 wherein said means for introducing said pressurized air between said support surface and said lowermost sheet comprises a plurality of holes extending through said support member to said support surface.

8. The apparatus set forth in claim 7 having means for introducing air at a high velocity into the spaces formed between the depressed longitudinal edge portions of said lowermost sheet and the remainder of said stacked sheets, said air flow being initiated subsequent to the depression of the longitudinal edge portions of said lowermost sheet toward said supporting surface and prior to the advancing of said lowermost sheet from beneath said stacked sheets and being maintained for a period sufficient to allow at least a portion of said lowermost sheet to be advanced from beneath said remainder of the stacked sheets, said air flow causing said remainder of the stacked sheets to be slightly raised from said lowermost sheet and forming a thin air layer therebetween.

9. The apparatus set forth in claim 8 wherein at least one of said plurality of holes in said support member is inclined rearwardly relative to the direction of feeding of said sheets, the air flowing from said rearwardly inclined holes thereby impinging against the underside of said lowermost sheet in a rearward direction and exerting a rearward force on the air-suspended lowermost sheet preventing said sheet from prematurely advancing from beneath said stacked sheets.

10. The apparatus set forth in claim 8 wherein said means for introducing air between said lowermost sheet and said remainder of the stacked sheets comprises air nozzles disposed adjacent the longitudinal edges of said stacked sheets and adapted to direct said air inwardly and upwardly to impinge against the bottom surface of said remainder of the stacked sheets, and an air valve for controlling said air flow to said nozzles during a predetermined part of the feeding of said lowermost sheet.

11. The apparatus set forth in claim 10 wherein said valve maintains said air flow until said lowermost sheet is fully advanced from beneath said stacked sheets.

12. The apparatus set forth in claim 10 wherein a portion of said support surface is depressed from the adjacent portion an amount substantially equal to a single thickness of the sheets being fed, said valve being adapted to maintain said air flow until said lowermost sheet is advanced to said depressed portion of said support surface and to cut off said air flow thereafter while the feeding of said sheet is being completed.

13. The apparatus set forth in claim 6 for feeding substantially flat sheets wherein said support surface has a flat central portion disposed in parallel relation to said sheets and longitudinal edge portions inclined outwardly and away from said sheets, said inclined edge portions forming said transversely divergent passages with the longitudinal edge portions of said lowermost sheet.

14. The apparatus set forth in claim 6 for feeding transversely curved sheets having the longitudinal edge portions thereof curved upwardly from said support member wherein said support surface is substantially planar, said planar support surface forming said transversely divergent passages with said lowermost sheet.

15. The apparatus set forth in claim 6 for feeding transversely curved sheets having the longitudinal edge portions thereof curved upwardly from said support member wherein said support surface has a flat central portion and longitudinal edge portions inclined outwardly and towards said sheets, said inclined edge portions forming said transversely divergent passages with said lowermost sheet.

16. The apparatus set forth in claim 6 wherein said feed means comprises feed fingers engageable with a transverse edge of said lowermost sheet along the depressed portions thereof and driven pinch rolls having a roll nip positioned adjacent the transverse edge of said lowermost sheet remote from said feed fingers, said feed fingers being longitudinally reciprocable and advancing said sheet into said roll nip, said pinch rolls thereafter withdrawing said lowermost sheet from beneath said stacked sheets.

17. The apparatus set forth in claim 16 having two feed fingers slidably mounted within said support member adjacent the longitudinal edges thereof, each of said fingers having a surface projecting above said support surface for engaging the transverse edge of said lowermost sheet along the depressed portions of said sheet.

References Cited in the file of this patent

UNITED STATES PATENTS

| | | |
|---|---|---|
| 2,806,696 | Bishop | Sept. 17, 1957 |
| 2,953,371 | Smith | Sept. 20, 1960 |